United States Patent [19]

Irwin et al.

[11] 4,128,890

[45] Dec. 5, 1978

[54] INTEGRATED ARITHMETIC UNIT AND DIGITAL NETWORKS USING THE UNIT

[75] Inventors: John M. Irwin, Clay; Fritz H. Schlereth, Baldwinsville, both of N.Y.

[73] Assignee: General Electric Company, Syracuse, N.Y.

[21] Appl. No.: 811,194

[22] Filed: Jun. 29, 1977

[51] Int. Cl.² .................... G06F 15/34; G06F 7/39
[52] U.S. Cl. ............................ 364/724; 364/736; 364/758
[58] Field of Search ............... 364/724, 736, 745, 757, 364/758

[56] References Cited

U.S. PATENT DOCUMENTS

| 3,947,670 | 3/1976 | Irwin et al. | 364/758 |
|---|---|---|---|
| 3,980,873 | 9/1976 | Mattei | 364/724 |
| 4,021,654 | 5/1977 | Harris et al. | 364/724 |
| 4,034,197 | 7/1977 | Lawrence et al. | 364/724 |

Primary Examiner—Jerry Smith
Attorney, Agent, or Firm—Richard V. Lang; Carl W. Baker; Frank L. Neuhauser

[57] ABSTRACT

The invention relates to an arithmetic unit fabricated by large scale integration techniques and to an improved digital network of increased accuracy in which the unit finds application. The integrated circuit comprises an initial summing means, rounding means, full precision multiplication logic and three successive summing means, all elements being successively connected, and all except the first having both internal and external input terminals. The unit is flexible in respect to the length of the operands and their sign notation. The terminals are readily cascaded, permitting interconnection of the unit with like integrated circuit units and with external delay elements. The invention is applicable in a variety of complex operations including digital filtering, correlation, convolution, polynomial evaluation and squaring. In many of these applications, mixed precision and rounding provide increased accuracy in the resulting digital networks.

21 Claims, 10 Drawing Figures

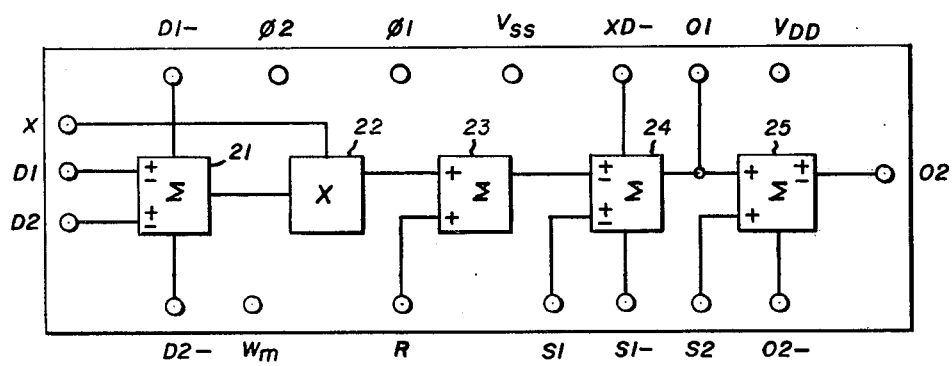
FIG.1.
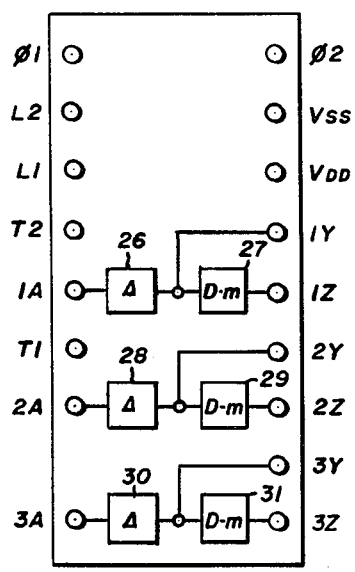
FIG.2.
FIG.5.
| MULTIPLICAND SIZE | DOUBLE PRECISION WORD SIZE | LENGTH $L_2$ $L_1$ | | TRIM $T_2$ $T_1$ | | FROM INPUT | |
|---|---|---|---|---|---|---|---|
| | | | | | | DELAY TO OUTPUT Y | DELAY TO OUTPUT Z |
| 8 BITS | 24 BITS | 0 | 0 | 0 0 | | USE DIR. CON. FOR 0 BIT DELAY | 22 BITS |
| | | | | 0 | 1 | | 23 BITS |
| | | | | 1 | 0 | | 24 BITS |
| 12 BITS | 28 BITS | 0 | 1 | 0 | 0 | 4 BITS | 26 BITS |
| | | | | 0 | 1 | | 27 BITS |
| | | | | 1 | 0 | | 28 BITS |
| 16 BITS | 32 BITS | 1 | 0 | 0 | 0 | 8 BITS | 30 BITS |
| | | | | 0 | 1 | | 31 BITS |
| | | | | 1 | 0 | | 32 BITS |
| 24 BITS | 40 BITS | 1 | 1 | 0 | 0 | 16 BITS | 38 BITS |
| | | | | 0 | 1 | | 39 BITS |
| | | | | 1 | 0 | | 40 BITS |
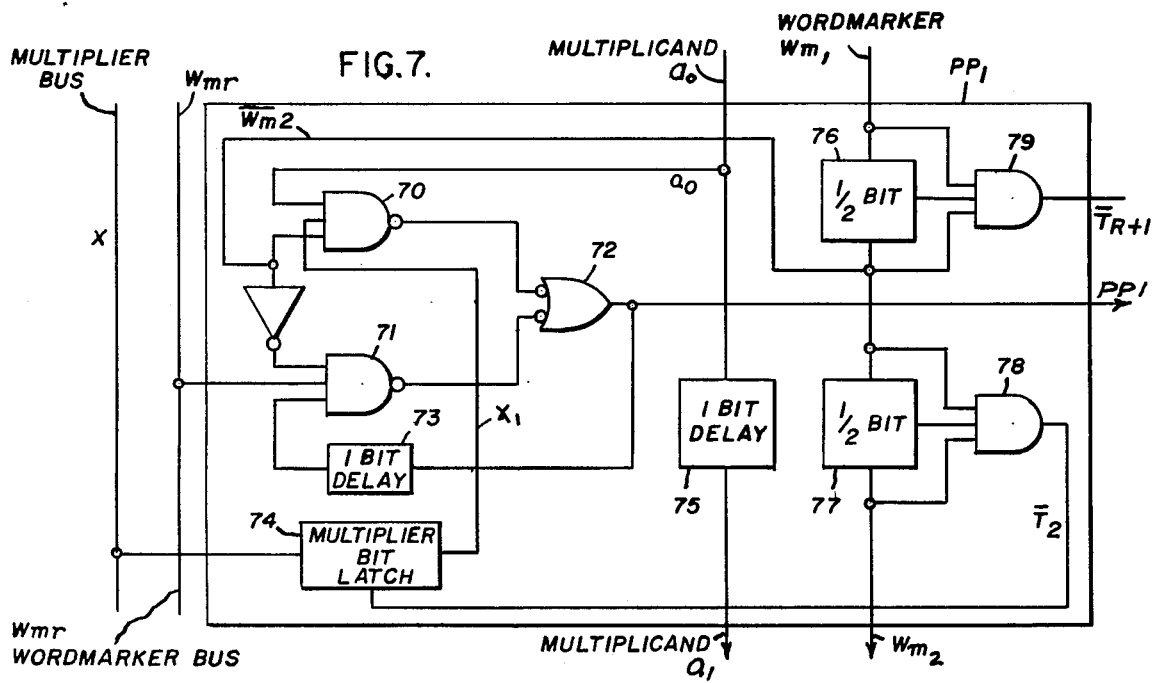
FIG.7.

INTEGRATED ARITHMETIC UNIT AND DIGITAL NETWORKS USING THE UNIT

BACKGROUND OF THE INVENTION

1. Field of the Invention

The present invention relates to an integrated arithmetic unit for use in the field of computation and more particularly to computation in which precision multiplication is required. The arithmetic unit is for use in digital filters, correlation, convolution, polynomial evaluation or squaring. The design is optimized for integration and for flexible interconnection with other like units, or delay units, and for assembly into more complex computing systems.

2. Description of the Prior Art

The invention is applicable to a wide variety of digital computations. In digital filters, for instance, wherein recursive or integrative feedback loops occur, prior art filters frequently employ arithmetic means which introduce an appreciable error into the computation. The error occurs in the use of less than double precision multiplication, or in the use of truncation in the operands. If double precision is retained, there is great difficulty in contending with word growth, particularly when many functions are combined in a single integrated circuit.

The present invention represents an outgrowth of earlier work described in U.S. Pat. No. 4,020,334 of Noble R. Powell and John M. Irwin, entitled "Integrated Arithmetic Unit for Computing Summed Indexed Products." In that patent, a series of functions involving summation, single precision multiplication means and summation are combined in a single integrated circuit unit. The unit also contains a second single precision multiplication means which, together with the first multiplication, performs vector matrix multiplication. A primary application of that unit is in computation of the fast fourier transform. Also relevant to the present invention is U.S. Pat. No. 3,947,670 entitled "Signed Multiplication Logic" of John M. Irwin et al, which discloses the multiplication logic for obtaining a single precision product. The partial product stages described therein form truncated partial products suitable for formation of a single precision product. Filed concurrently herewith is an application Ser. No. 811,193 of John M. Irwin entitled "Signed Double Precision Multiplication Logic." This application treats the multiplication logic, which is used in the arithmetic unit and digital networks treated herein.

SUMMARY OF THE INVENTION

Accordingly, it is an object of the present invention to provide an improved integrated arithmetic unit for use in digital networks and using serial data.

It is another object of the present invention to provide an improved integrated arithmetic unit for use in digital filters, correlation, convolution, polynomial evaluation, or squaring and using serial data.

It is yet another object of the present invention to provide an improved integrated arithmetic unit for use in digital networks for serial data capable of 1, 2 or 4 quadrant multiplication.

It is an additional object of the present invention to provide an improved integrated arithmetic unit for use in digital networks, using serial data wherein at least one of the operands and the output are in two's complement notation.

It is still another object of the present invention to provide an integrated arithmetic unit which is capable of use with operands of one of a plurality of word lengths.

It is a further object of the present invention to provide an integrated arithmetic unit having improved accuracy in recursive or transveral digital networks.

It is another object of the present invention to provide an improved integrated arithmetic unit for serial data providing the successive functions of summation, multiplication and summation.

It is yet another object of the present invention to provide an integrated arithmetic unit capable of use with operands of one of a plurality of word lengths in which the timing and control for arithmetic functions are integrated.

It is another object to provide an integrated arithmetic unit which has corresponding input and output terminals operating in the same time reference for data connections between the same or different units.

It is a further object of the invention to provide an integrated arithmetic unit wherein the word processing time is matched to the transport delay.

It is an additional object of the invention to provide an integrated arithmetic unit providing the successive functions of algebraic summation, multiplication, and summation having a minimum of external terminals.

It is still a further object of the present invention to provide an integrated arithmetic unit providing the successive functions of summation, multiplication and summation in which the timing is integrated.

It is an object of the present invention to provide a digital network comprising an integrated arithmetic unit having input and output terminals and a programmable integrated delay unit permitting flexible output-input terminal interconnection.

It is still a further object of the present invention to provide an improved digital network for serial data having improved accuracy in recursive or transversal digital networks.

It is yet another object of the present invention to provide an improved digital network for serial data permitting data connections of mixed precision.

It is yet another object of the present invention to provide an improved digital network for serial data which is applicable for use in digital filters, correlation, convolution, polynomial evaluation or squaring.

These and other objects of the invention are achieved in a novel integrated arithmetic unit for use in serial digital networks. The integrated arithmetic unit comprises a first serial summer having a pair of inputs (D1, D2) for external connection and producing an output sum, (D1 + D2), serial double precision multiplication logic having a first input coupled to the output of the summer and a second input (X) for external connection, to produce double precision output products (D1 + D2) X, and a second serial summer having a first input coupled to the output of the multiplication logic, and a second input (S1) for external connection, and producing an external output sum (O1):

$$O1 = [(D1 + D2) X + S1]$$

In accordance with an aspect of the invention, the multiplication logic is adaptable to input operands of one of a plurality of word lengths, the multiplication logic having an external input (WM) to which a timing control waveform is applied for defining the number of valid bits (m) of the first internal input (D1 + D2) and for defining the number of valid bits (n) of said external input (X).

In accordance with another aspect of the invention, rounding means are provided connected in one or both of the data paths to the multiplication logic. The rounding means rounds by first adding a bit to the internal data equal to the most significant fractional bit thereof, and subsequently cancelling all fractional bits in the resulting sum to obtain the quantities (D1 + D2)', or (X)'', wherein ('), ('') denote rounding.

In addition, a third serial summer, which may optimally provide rounding, is provided, coupled to the output of the multiplication logic. The third serial summer has an external input (R), and couples data to the second serial summer, the output (O1) of the second summer becoming:

$$O1 = [(D1 + D2)' X'' + R + S1]$$

The arithmetic unit is completed by a fourth serial summer having an internal input coupled to the output of the second serial summer, and an external input (S2), the fourth serial summer having an external output (O2):

$$O2 = (O1 + S2)$$

The serial multiplication logic is designed for data at the first internal input (D1 + D2) in two's complement notation, and for data in its second, external input (X) in two's complement or sign magnitude notation.

Consistent with sign flexibility, a first and a second sign changing means are provided on the unit for controlling the first (D1) and second (D2) inputs to the first summer, respectively, the first and second sign changing means being serial two's complementers.

In addition, a third and a fourth sign changing means are provided on the unit for controlling the first and second input (SL) to the second summer, respectively, and a fifth and sixth sign changing means are provided on the unit for controlling the first and second inputs (S2) to the fourth summer, respectively, the fifth and sixth sign changing means being two's complementers.

In accordance with another aspect of the invention, a new digital network is disclosed comprising a first serial summer having a pair of signed inputs ($\pm$ D1 $\pm$ D2) and producing an algebraic sum:

($\pm$ D1 $\pm$ D2);

rounding means coupled to the output of the summer for rounding to an m bit word length:

($\pm$ D1 $\pm$ D2)';

serial four quadrant multiplication logic having a first m bit multiplicand unit coupled to the output of the rounding means and a second n bit multiplier input (X), the multiplicand logic producing a double precision output product $\pm$ [($\pm$ D1 $\pm$ D2)' X]

in words of m + n bits; a second serial summer having a first signed input coupled to the output of the multiplication logic, and a second signed input (S1) and producing an algebraic output sum (O1):

$$O1 = \pm [(D1 \pm D2) X \pm S1]$$

the network having a predetermined transport delay D between the input of the first serial summer and the output of the second serial summer, and a delay element connected in a feedback path for coupling data between the output of the second summer and the input (D1) of the first summer and having a delay ($\Delta$) substantially equal to the difference in bit times between (m + n) and D, so that the output data is combined with the data applied to the other input (D2) of the first summer during the succeeding word.

A second delay element is also provided in the network coupled between the output of the first delay element and the second input path (S1) to the second summer, having a delay substantially equal to the transport delay (D), so that the output data is coupled to the data applied to the first input of the second summer during the succeeding word to form a double precision feedback loop.

The indicated first serial summer, the rounding means, the full precision logic, and the second serial summer are adaptable to operands of a plurality of word lengths. Preferably, these elements are assembled on a first integrated circuit. Correspondingly, the first and second delay elements, which are preferably electrically programmable for the plurality of operand word lengths and corresponding increases in word processing time, are assembled on a second integrated circuit. In this manner a large variety of functional networks may be conveniently formed.

The filter described above is a one pole recursive filter having the following mathematical property:

$$y(n) = K x (n - 1) + y (n - 1) - K y (n - 1)$$

Another novel form of network performing a single pole filter function may be assembled using two arithmetic units and a single delay unit. In this network, the input data (Xn) is applied to a second arithmetic unit, and introduced from the O1 output of that unit into the S1 input of the first arithmetic unit, these being in the same time reference. Except for changing the data input to the second arithmetic unit, the first arithmetic unit and delay unit are connected as before, and the output is taken from the same point.

Assuming that the factor $K_1$ is introduced into the multiplication logic of the first arithmetic unit and that the factor $K_0$ is introduced into the multiplication logic of the second arithmetic unit, the filter has the following mathematical property:

$$y(n) = K_0 x (n - 1) + (1 - k_1) y (n - 1).$$

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings, in which:

FIG. 1 is a simplified block representation of an arithmetic unit formed as a single integrated circuit element and incorporating an initial summer, double precision multiplication logic, and subsequent summers useful in a variety of digital networks including digital filters;

FIG. 2 is a simplified block representation of a digital delay unit formed as a single integrated circuit element and providing a variety of electrically programmable delay options selected for maximum flexibility in recursive and transversal connections to said arithmetic unit;

FIG. 5 is a table illustrating the delay versus terminal conditions of the digital delay unit;

FIG. 7 is a simplified diagram of a partial product stage of the double precision multiplication logic;

DESCRIPTION OF THE PREFERRED EMBODIMENT

An arithmetic unit embodying the invention and suitable for use in a large number of digital applications, including digital filtering, correlation convolution, squaring, and polynomial evaluation is illustrated in FIG. 1. The arithmetic unit is typically formed by large scale integration techniques on a single monolithic chip. The arithmetic unit is shown as a rectangular block symbolizing the outline of the chip with external connections to pads distributed along its perimeter. A plurality of smaller blocks are shown within the large rectangular outline symbolizing the circuitry for performing the indicated logic functions. In a practial form, the chip is of silicon, using low threshold silicon gate P-channel MOS transistor technology.

Figures 3, 9A, 9B:
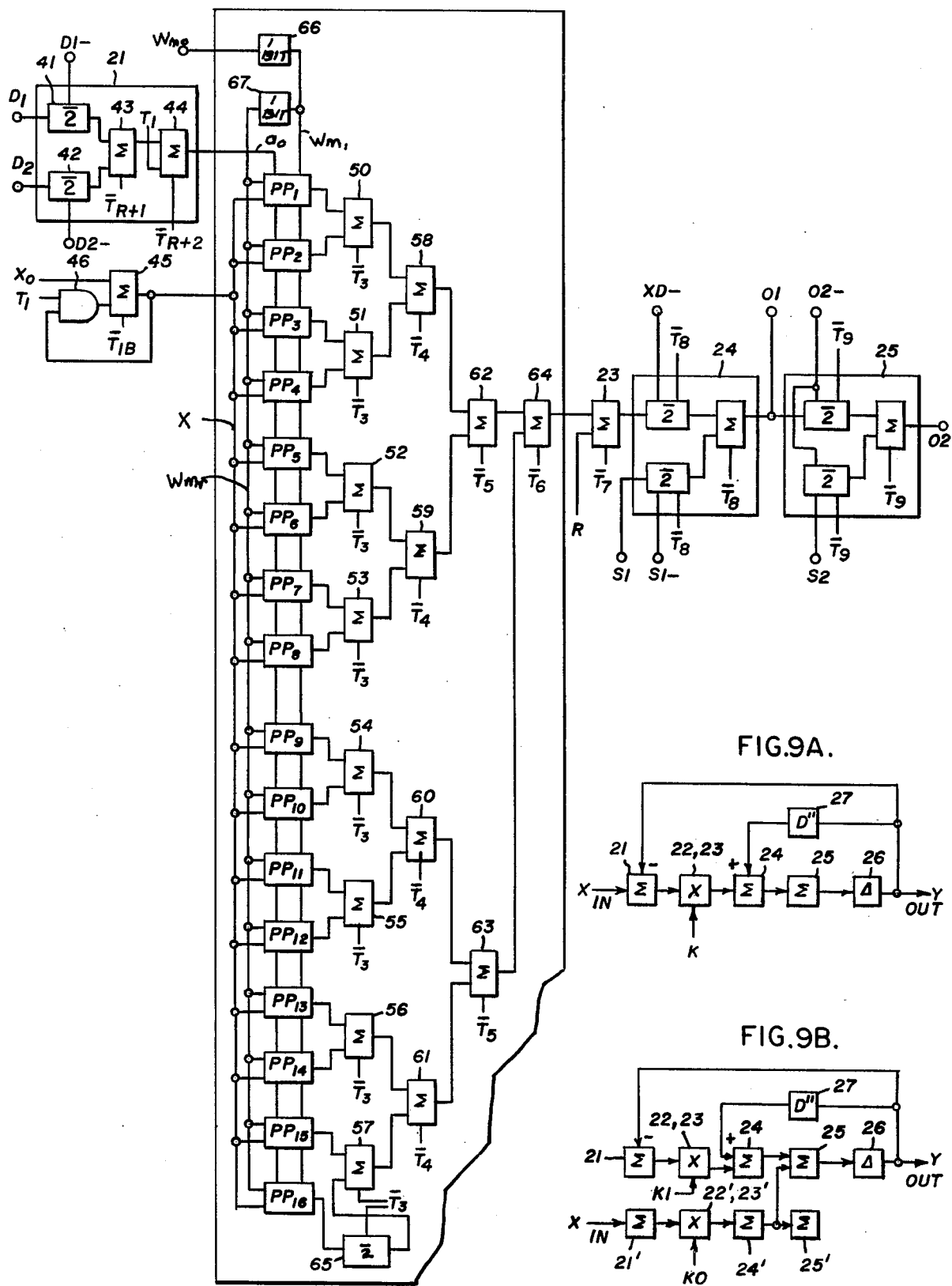
FIG. 3 is a more detailed block diagram of the arithmetic unit showing the principal components of the blocks illustrated in FIG. 1, including sign changing, rounding, partial product selection, and the summation means.
FIGS. 9a and 9b are two simplified block diagrams of typical one pole recursive filters using a combination of one or two arithmetic units and a digital delay unit.

The first arithmetic unit is shown in both FIGS. 1 and 3. As shown in FIG. 1, the unit contains the logic blocks 21 through 25. These include a summer 21, a double precision multiplier 22, a summer 23, a summer 24 and a summer 25. All are serially connected in the order recited and each after the first contains inputs for response to an internal and an external data input. As suggested by the sign indication ($\pm$), the first summer 21 includes two sign changing means, typically two's complementers. The first sign changing means is in the serial data stream (D1) and responds to a first sign control (D1$-$). The second sign changing means is in the second serial data stream (D2) and responds to a second sign control (D2$-$). The summer contains summation means for algebraic summation of D1 and D2 and a summer that rounds to a standard word length as more exactly shown in FIG. 3. The summer 21 combines the two serial binary data streams from the D1 and D2 inputs to produce a sum:

$$(\pm D1 \pm D2) \quad (1)$$

The rounding in the summer 21 to a standard word length is denoted by an apostrophe (" ' "):

$$(\pm D1 \pm D2)' \quad (2)$$

The quantity (2) becomes the multiplicand in the multiplication logic 22. It is coupled to the internal input of the double precision multiplication logic 22. The double precision multiplication logic has an external input for application of a serial data stream (X). As shown in the more detailed diagram of the multiplication logic contained in FIG. 3, the X input data stream is passed through a summer that rounds to a standard word length prior to application to the multiplication logic as more exactly shown in FIG. 3. The rounded data stream (X'') becomes the multiplicand. The full precision product of logic 22 is expressable as follows:

$$(\pm D1 \pm D2)' X'' \quad (3)$$

Assuming that both roundings are to 16 bits, the word length of the product of the multiplication logic is 32 bits.

The product of the multiplication logic is coupled to the internal input of summer 23. The serial data stream (R) is applied to the external input of summer 23. The summer 23 has no sign changing means. The summed quantity produced by summer 23 may be represented as follows:

$$(\pm D1 \pm D2)' X'' + R \quad (4)$$

The quantity (4) is applied to the internal input of the summer 24. The summer has two sign changing means, one in the internal input path from summer 23, and the other in the external path for serial data stream (S1). The first sign control (X D$-$) controls the sign of the internal input quantity, while the second sign control (S1$-$) controls the sign of the external input quantity (S1). The first output (O1) of the summer 24 is coupled to one input of the final summer 25 and to an external terminal via an output driver network. The output (O1) is expressable as follows:

$$O1 = (\pm D1 \pm D2)' X'' + R \pm S1 \quad (5)$$

The quantity (5) is applied to the internal input of the summer 25. The serial data stream S2 is applied to the external input of the summer 25. The summer 25 has a sign changing means having a single control input (O2 $-$) which simultaneously controls the sign of both the internal (O1) and the external (S2) inputs. In effect, it controls the sign of the output (O2). As shown in FIG. 3, the sign control consists of two two's complementers having a common sign control connection. The output O2 of the summer 25 is coupled to an external terminal via an output driver network. It is the second data output of the arithmetic unit. The O2 output may be expressed as follows:

$$(O2 = \pm (O1 + S2) \quad (6)$$

In addition to the thirteen external connections on the arithmetic unit which are for data exchange or sign control, there are five others. One connection is for data word length control using a word marker waveform (WM). Two connections are for clocking, one being for the phase 2 ($\phi_2$) waveform and the other for the phase 1 ($\phi_1$) waveform, 180° out of phase and non-overlapping with the former. The +5 volts source (VSS) and the 0 volts drain (VDD) are the last two connections.

The arithmetic unit is designed for signed serial input and output data with the capability of accommodating variations in word lengths and in sign treatments. In particular, each of the inputs D1, D2, R, S1, S2 inputs are designed for negative numbers in two's complement notation. The X input may be in either two's complement, sign magnitude, or unsigned notation. The (O1, O2) output data format represents the negative numbers in two's complement notation. The D1, D2 multiplicand input may be in words of any arbitrary length, provided that the "low" portion of the word marker is set to an equal number of bits. The word length of the multiplier (X)" after rounding may not exceed the number of partial product selectors (e.g. In the FIG. 3 embodiment, there are sixteen partial product selectors.) The high portion of the word marker is set equal to the number of multiplier bits. When the word length is less than the number of partial product selectors, the multiplier should be in sign magnitude notation with the sign separately applied to the final product.

The arithmetic unit has particular application to digital networks, including recursive networks in which output data (e.g. O1 or O2) is reintroduced into the unit prior to or subsequent to the double precision multiplier (e.g. inputs D1, D2, X or S1, S2) of the same or another unit. When the data is reintroduced, it is essential (unless there is a scale factor) that it be reintroduced in registry with bits of like significance into the main data stream. In a common recursion relation (where the scale factor is unity), the data reintroduction occurs at the first bit of the next word of the main data stream. Thus, the number of bits of delay to the data stream as it progresses through the arithmetic unit must be known and any feedback loops closed only in accordance with a correct one word time delay. As will be explained, the first arithmetic unit requires a 24 bit word processing time for an 8 bit multiplicand. In addition, the first arithmetic unit has a 24 bit transport delay. The transport delay is the time measured in bits between entry of the most significant bit into the D1 or D2 and inputs to the time of exit of the most significant bit at output O2. Assuming commensurate operands, and this equality between the word processing time and the transport delay, the O2 output may be coupled in a feedback loop directly to the D1 or D2 inputs or the arithmetic unit with the exact one word delay required for proper closure of the loop. Had a longer multiplicand of 12, 16 or 24 bits been employed, the word processing time increases to 28, 32 or 40 bits, while the 24 bit transport delay remains unchanged. To close the loop from the O2 output to the D1 or D2 inputs with longer multiplicands, external delays (Δ's) of 4, 8 or 16 bits must be added to restore equality between the word processing time and the transport delay. The S2 input and the O1 output are in the same time reference permitting ready interconnection between different units.

The growth in word processing time with larger multiplicands is attributable to the double precision multiplication logic. Since the multiplication logic is of double precision, a 16 bit multiplier and an 8 bit multiplicand grow in the multiplication logic to a 24 bit product. If a 12, 16 or 24 bit multiplicand is used, the word growth of the product is to 28, 32 and 40 bits respectively. The length of the double precision product sets the word processing time and sets the maximum rate at which words may be introduced into the arithmetic unit.

The 24 bit time transport delay remains constant with multiplicand word length and arises principally (20 bit times) in the multiplication logic as opposed to the associated summers (4 bit times). As will be seen in connection with FIG. 3, the serial input data is distributed to a series of parallel partial product selectors. Assuming that there are 16 such selectors, each storing one of 16 multiplier bits, and that the multiplicand is entered at one bit time intervals, the most significant bit of the multiplicand must wait 15 bit times from multiplication in the first partial product selector unit multiplication in the last partial product selector. The same 15 bit time delay is required whether the multiplicand is 8 or 24 bits or of some other length. consolidation of the bit stream subsequent to the selectors requires 4 more bit times. There is an additional rounding process associated with the input to the multiplier which increases the total time delay in the multiplication logic to 20 bit times.

In short, freedom to close the feedback path before or after the multiplication logic requires both a variable delay at 4 bit time increments, assuming similar multiplicand length increments, and a fixed delay substantially equal to the transport delay in the multiplication logic. A last pair of requirements of an associated delay element are that it permit freedom of choice in feedback connection to the summers subsequent to the multiplier and for scaling flexibility at that feedback connection. These three delay requirements are conveniently met in the arithmetic delay unit now to be described.

Figure 4:
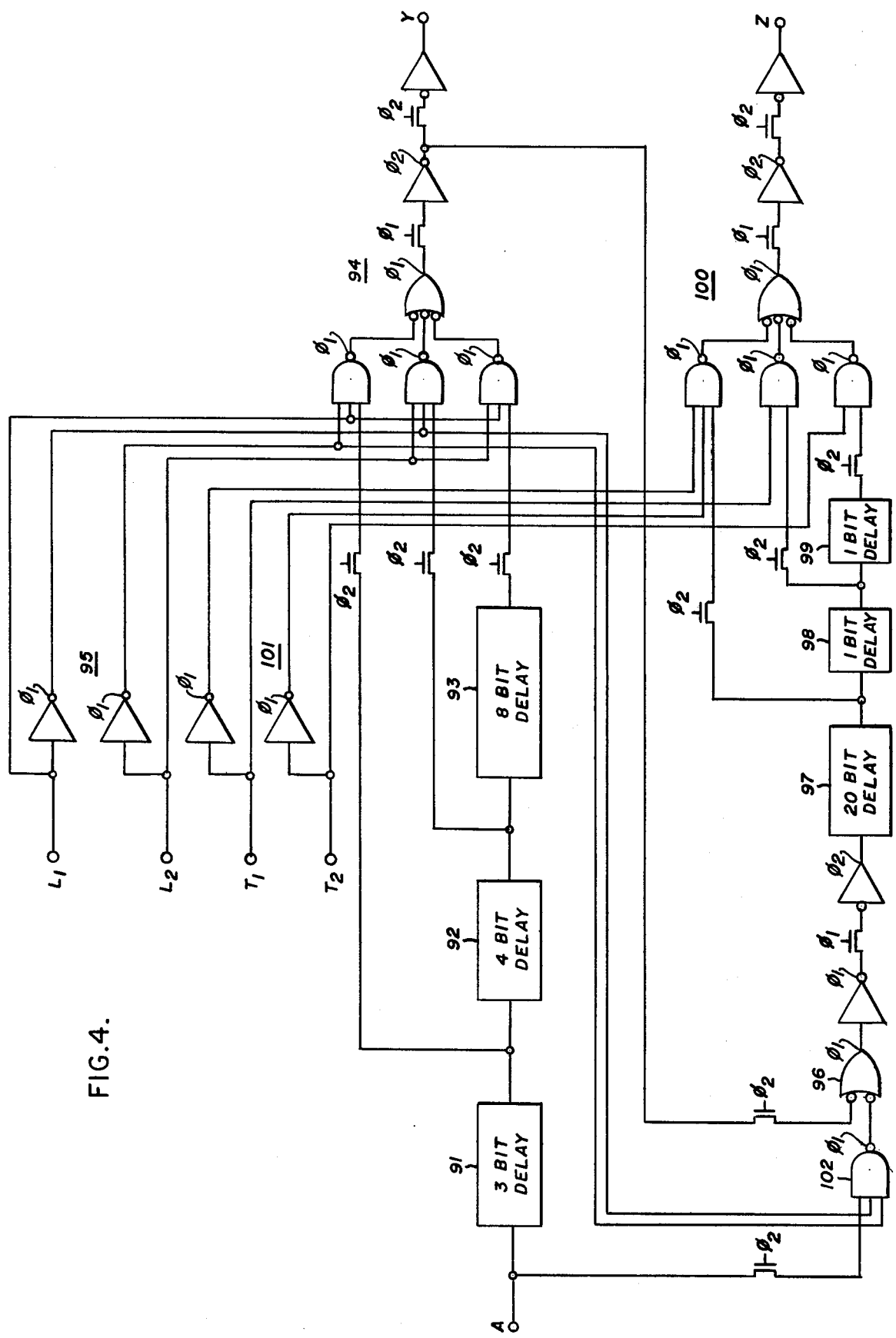
FIG. 4 is a more detailed block diagram of the digital delay unit showing the principal components of the blocks illustrated in FIG. 2.

The digital delay unit is depicted in FIGS. 2, 4 and 5. Consistent with efficiency in integration, the delay unit consolidates three delay networks into a single integrated circuit. One might have selected a smaller or a larger number of delay networks. The pin count, chip size and yield determined this selection. Each delay network has the full flexibility mentioned above and more explicitly set forth in the table of FIG. 4. The three networks are electrically programmed in unison from a set of four control terminals. A diagram of a single delay unit is shown in FIG. 5. The description will proceed first with reference to FIG. 2 which is a highly simplified block diagram of the delay unit.

As shown in FIG. 2, the digital delay unit contains the six blocks 26 through 31 on a monolithic silicon chip symbolized by a rectangle. Along the perimeter of the chip are arranged 18 pads by which electrical connection is made to the chip. The first delay network contains a first delay unit 26 coupled between input 1A and output 1Y. The delay unit 26 bears a symbol Δ. The unit 26 provides an electrically programmable delay of 4, 8 or 16 bits to provide adjustment for variable multiplicand length as indicated in the table of FIG. 5. The electrical programming control signal for the delay block 26 is applied to the L1 and L2 inputs respectively. The output of delay block 26 is connected to the input of a second programmable delay element 27 bearing the symbol (D − m). The symbol D implies a delay equal to 24 bits, the transport delay of the arithmetic unit, while m implies a trimming adjustment of 0, 1 or 2 bits as illustrated in the table of FIG. 5. The output of the delay block 27 is coupled to the 1Z output of the digital delay unit. The electrical programming control signal for the delay block 27 is applied to the T1 and T2 inputs respectively. The delay units 26 and 27 together with the control circuits associated with connections L1, L2, T1 and T2 form the first delay network on the chip. The second delay network consists of the delay 28 symbolized by a "Δ", and connected between input 2A and output 2Y, respectively, and a delay 29 symbolized by a "(D − m)" and connected between the output of delay 28 and output 2Z. The third delay network consists of a delay 30 symbolized by a "Δ" and connected between inputs 3A and output 3Y respectively and a delay 31 symbolized by "(D − m)" and connected between the output of delay 30 and output 3Z. The arithmetic delay unit also contains four additional external connections including two for energization: VSS, VDD and two for clocking: phase 1 clocking ($\phi$1) and phase 2 clocking ($\phi$2).

Different arithmetic units (e.g. O1 − S2) and the same units may be interconnected (e.g. O2 − D) without delay. The digital delay unit may be used to provide the following additional connections to the first arithmetic unit. The 1A, 2A or 3A delay inputs of the delay unit may be applied to the O1 or O2 outputs of the first arithmetic unit, while the 1Y, 2Y or 3Y delay outputs may be applied to either the D1, D2 or X inputs of the arithmetic unit (or to the other inputs under some conditions). This permits a full word delay at these inputs for accommodating multiplication of 8, 12, 16 or 24 bits. The 1Z, 2Z or 3Z delay outputs may be applied to either the R, S1 or S2 inputs of the arithmetic unit (or to the other inputs under some conditions). When so applied this second feedback loop, which contains both the Δ and the (D − m) delays, also provides the required one word delay.

The delay unit shown in the block diagram of FIG. 2 is shown in greater detail in FIG. 4, which deals with a single delay circuit. The input to the circuit A in FIG. 4 may be assumed to correspond to the input 1A in FIG. 2. The programmable delay Δ, item 36 in FIG. 1, corresponds to the elements 91 to 95. Elements 91, 92 and 93 are three serially connected delays of respectively 3, 4 and 8 bits, the first of which is coupled to the A input of the delay network. Element 94 is the output logic consisting of three AND gates and an OR gate. The AND gates each obtain an input from the output of one of the delays 91, 92 or 93 and the other two inputs of each AND gate are coupled to the "length" electrical control network 95. As shown in the table of FIG. 5, the "length" control network 95 responds to $L_1$ and $L_2$ control signals at the input pads of the delay chip. These two signals are digital and define four control states in which either one or none of the AND gates in 94 is "true." The outputs of the AND gates are coupled to a three input OR gate and via a 1 bit delay to the Y output terminal. Assuming a $L_1 = 1$, $L_2 = 0$ control setting, the upper AND gate is true, the other two are false and the first delay unit 91 is connected in the circuit. Adding the 1 bit output delay, the delay between 1A and 1Y (Δ) is four bits. Assuming $L_2 = 1$, $L_1 = 0$, the intermediate AND gate is true, delays 91 and 92 are serially entered, which with the 1 bit output delay produces a Δ of 8 bits. Assuming $L_1 = 1$, $L_2 = 1$, the last AND gate is true and delays 91, 92 and 93 are serially entered, leading to a Δ of 16 bits. If both $L_1$ and $L_2$ are zeros, no output is produced and a direct connection between 1A and 1Y must be made.

The second part of the delay network is the D−m branch, element 27 of FIG. 2, connected between 1Y and 1Z. As noted, "D" is set equal to the 24 bit transport delay of the arithmetic unit and "m" corresponds to a 0, 1 or 2 bit reduction from that value. The D−m branch as shown in FIG. 4 consists of the elements 96 to 101. Its input is connected at the internal output of delay Δ. Elements 97, 98 and 99 are respectively 20, 1 and 1 bit delays serially coupled in the order recited. The three delays are controlled by an output logic circuit 100 which responds to the $T_1$, $T_2$ inputs applied at input network 101. The output logic consists of three AND gates and an OR gate. Including initial and final 1 bit delays, the control setting, in which all inputs ($T_1$, $T_2$, $L_1$, $L_2$) are zero, makes the first AND gate true, giving a (D − m) branch delay of 22 bits. Adjusting $T_2$ and $T_1$ permits m to equal 0, 1 or 2 by selectively adding 1 bit delays 98 and 99 via the remaining AND gates of 100. The circuit is designed so that any one or none of the AND gates is true, and the available output is coupled via the OR gate to the delay unit output of Z.

The input logic into the D−m branch, consists of an AND gate 102 whose output is ORed in 96 with the output from 94. When both $L_1$ and $L_2$ are "0's" the AND gate 102 is true and couples the A input via OR gate 96 to the D−m branch. Under these conditions $L_1$, $L_2 = 0$, the Δ branch produces no output. In all other cases, AND gate 102 is false and the input to the D−m branch is derived via the Δ branch. This being true, the total delay from input 1A to input 1Z can assume the twelve values noted in Table 5.

Referring now to FIG. 3, a more detailed logic diagram of the arithmetic unit is provided. The elements 41, 42, 43 and 44 are the components of the summer 21 illustrated in FIG. 1. The elements 41 and 42 are two's complementers to which the input data streams D1 and D2 are applied, and which have the control terminals (D1−) and (D2−) respectively. The sign controlled outputs of 41 and 42 are coupled for summation to the means 43. The output of 43 is rounded to a word length, consistent with the other input parameters in summer 44 under control of the input T1 (i.e. bit time T1). (The multiplicand rounding configuration is more exactly described in connection with the multiplier input (i.e. 45, 46) to the multiplication logic.) Each element 41 to 44 receives a clearing pulse at a prescribed time ($\overline{T}_{r+1}$, $\overline{T}_{r+2}$) as noted on the drawing. The output of 44 provides a suitably rounded multiplicand to the double precision logic.

The multiplier input (X) to the multiplication logic is rounded by the summation means 45, acting in conjunction with the two input AND gate 46 in response to the input $T_1$. The rounding configurations are set to round both the multiplier X and the multiplicand (± D1 ± D2) to 16 bits.

The two rounding circuits for (± D1 ± D2) and X operate in the same manner. Assuming that both input quantities are 17 bits or longer, and that rounding to 16 bits is desired, a 17th "1" bit is added to the input quantity, and then the summed quantity is truncated from the 17th bit on. As will be seen, rounding is chosen opposed to simple truncation because of its greatly improved error characteristics.

As shown in FIG. 3, the signed four quadrant double precision multiplication logic 22 has its multiplicand input coupled to the output of 44 (± D1 ± D2)' and the multiplier input coupled to the output of 45 (X"). The product output is coupled to summer 23. The multiplicand is of 16 bits, but as will be seen, assuming appropriate adjustment of the timing waveforms, it may be of any desired numbers of bits in length. The multiplier is of 16 bits, which corresponds to the number of partial product stages in the multiplication logic, although a multiplier of fewer bits may be accommodated. The product is of 16 plus 16 (or 32) bits, including a redundant sign bit. In addition to the serial data interface quantities, a timing waveform (WM) is introduced to achieve integrated timing.

The multiplication logic is composed of a plurality of partial product stages PP1 to PP16 in which partial products are formed, a summation tree 50 to 65, which consolidates the partial products into a double precision product, and a pair of one bit delays 66 and 67 for setting the initial timing relationships.

The multiplication logic forms the product by generating a plurality of partial products, one in each partial product stage. To form each partial product, the multiplicand, the multiplier, and a delayed timing waveform are applied to three registers, not separately shown in FIG. 3, which distribute these quantities at correct times to each partial product stage. In addition, a timing waveform (WMr) at reference time is distributed to each partial product stage. These four quantities are applied to each partial product stage at the correct times via the two connections entering the top and the two connections entering the left edge of the block representing each partial product stage. The three registers, which are not separately shown, are distributed one stage at a time in each of the partial product stages. Thus, as shown in FIG. 3, the lower edge of each block representing a partial product stage contains two connections to the following higher numbered partial product stage. The connections symbolize the paths of the shifted multiplicand and the timing waveform as they are each transferred after one bit delays along a register distributed in each partial product stage. The multiplier register, also not separately shown in FIG. 3, is distributed one stage at a time in the partial product stages. As will be explained, the inputs to the multiplier registers are connected in parallel to the multiplier bus and the multiplier registers are controlled to select successive bits of each passing multiplier word.

Let us now consider the entry of the multiplicand, the multiplier and the timing waveforms (reference and delayed) into the partial product stages and the formation of the partial products.

Figure 6:
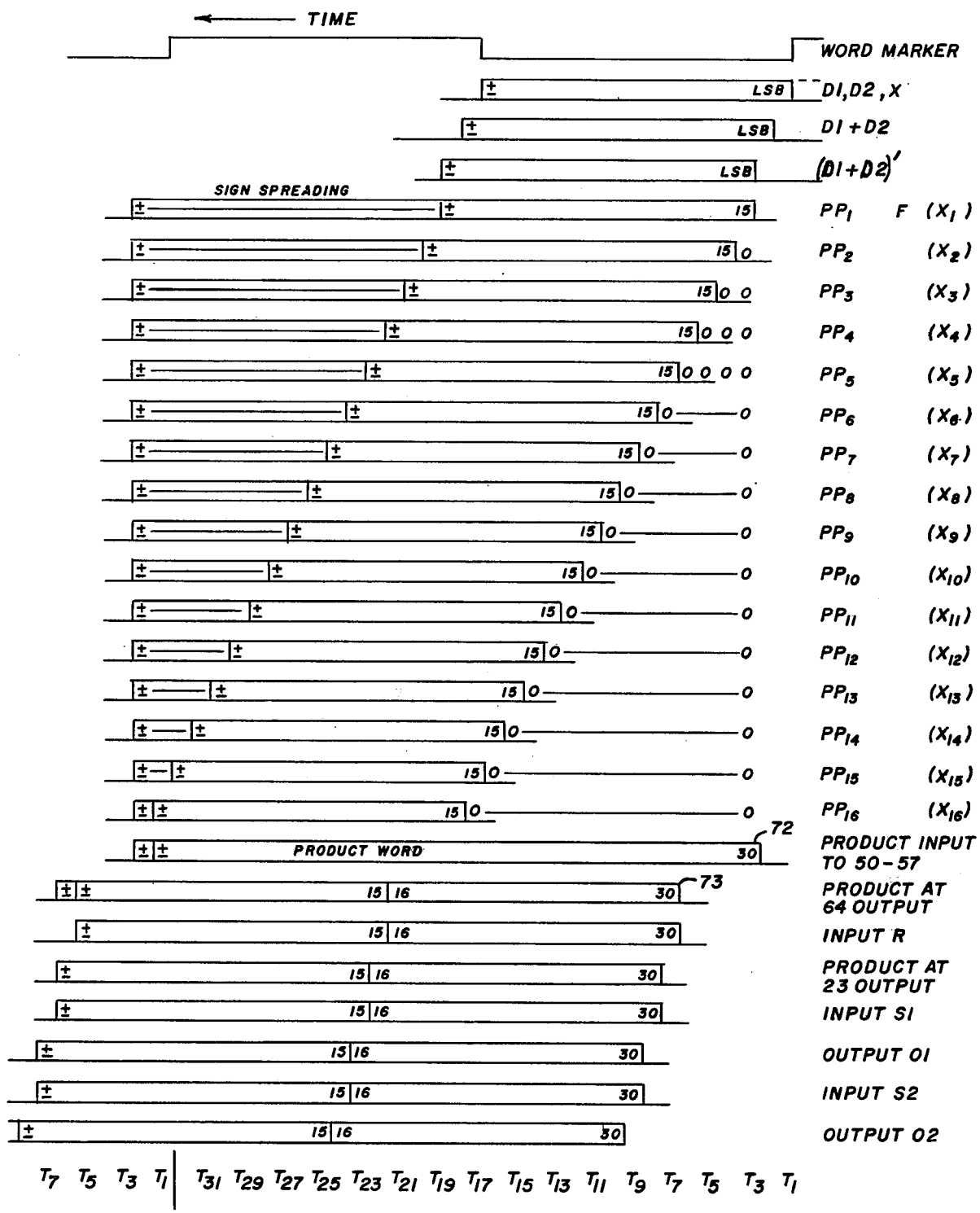
FIG. 6 is a sequencing diagram illustrating the treatment of the multiplicand and the multiplier in the formation of partial products, and their combination to obtain the product.

The timing (or word marker) waveform is the waveform at the top of the timing diagram of FIG. 6. It is applied at a reference time and successive 1 bit time delays to each stage PP1 to PP16 of the multiplication logic to mark the "valid" portions of the multiplicand, to select appropriate bits of the multiplier, to treat the sign bits, and to bound the product word. It is the principal means for achieving "integrated" timing. It consists of a first, low portion of 16 bit times, set equal to the number of multiplicand bits, and a second high portion of sixteen bit times, set equal to the number of multiplier bits — and the number of partial product stages. The timing waveform (WMr) is plotted against the bit times shown at the bottom of FIG. 6. It commences at bit time $T_1$, terminates at the end of the 32nd bit ($T_{32}$) and changes from the first to the second condition at time $T_{17}$.

The wordmarker WM is applied to the multiplication logic via the two one bit delays 66, 67, which allows the timing waveform to control circuitry prior to the multiplication logic. The timing waveform is applied through 1 bit delay 66 to the timing waveform register to PP1, and through a second 1 bit delay 67 to the timing waveform bus. This bus provides the timing waveform of reference time (WMr) to each partial product stage.

The timing waveform register stage in PP1 delays the timing waveform 1 bit, and delivers it to the partial product stage PP2. The process of delivering a successively later timing waveform continues until the last partial product stage PP16 at the input to the last stage, the low portion of the delayed waveform begins at bit time $T_{18}$ and ends at bit time $T_{34}$ ($T_2$ new word).

The multiplicand is entered at PP1 starting at nominal bit time $T_3$ and assuming a 16 bit quantity, entry continues through nominal bit time $T_{18}$. The low portion of the internally available timing waveform continues through the same nominal bit times $T_3$ through $T_{18}$. After $T_{18}$, sixteen bits remain until the end of the product word. Assuming that the shifted timing waveform changes to a high interval, the 16 remaining bits (at time $T_{16} - T_{34}$), ($T_2$ next word), spaced between the end of the present multiplicand word and the beginning of the next word, are interpreted as "don't care" inputs for reasons that will be developed. They are not utilized in further processing of the multiplicand and have no effect.

The multiplicand applied to the first partial product stage PP1 is applied to the first stage of the multiplicand register included in PP1. After a 1 bit delay it is transferred to PP2. The process of delivering successively later multiplicands continues until the last partial product stage PP16. At the input to the last stage, the shifted multiplicand begins at bit time $T_{18}$ and ends at bit time $T_{34}$ in synchronism with the shifted timing waveform.

The multiplier is entered from the multiplier bus one bit at a time from time $T_2$ through $T_{17}$ into each of the partial product stages PP1 to PP16. The least significant bit of the multiplier is entered first (at $T_2$ in PP1) and the sign bit is entered last (at $T_{17}$ in PP16). Assuming that the delayed timing waveform (WM) is of proper length, the remaining 16 bits spaced between the end of the present multiplier word and the beginning of the next word, are interpreted as "don't care" inputs for reasons that will be developed. They are not utilized in further processing of the multiplier and have no effect.

Entry of the multiplier bits in each partial product stage is achieved by the multiplier bit register. The multiplier bit register (not shown in FIG. 3) consists of a succession of flip-flops coupled via suitable logic to the timing register previously discussed. One stage of the multiplier bit register is present in each partial product stage. Each multiplier register stage selects a multiplier bit, and stores that bit until the same bit time in the next word.

The three registers and the timing waveform bus (WMr) just discussed provide multiplicand, multiplier and word length inputs required for the partial product stages PP1 to PP16 illustrated in FIG. 3. Each stage contains a partial product selector which forms a partial product. The partial products are added in the summation tree to produce the full precision product (C). Each partial product selector comprises two three input AND gates, an OR gate, and a one bit delay.

In the interests of integrated timing and ease in laying out a multiplication logic having other multiplier word lengths than the one herein described, each partial product stage is preferably formed in a single repetitive cell using a known integrated circuit fabrication technique. Each cell contains a partial product selector, a stage of each of the multiplicand, multiplier and timing registers. Each cell also contains additional logic, typically AND gates, coupled to the timing register for multiplier bit selection and for resetting stored carries of the summers in the summation means. The integration of the registers and gates with the partial product selectors into a common cell integrates the timing with the circuitry which requires it, and greatly simplifies the use of the resulting multiplication logic in association with the equipment. The elements of a single cell or partial product stage are shown in FIG. 7.

As shown in FIG. 7, the first partial product selector PP1 consists of AND gate 70, AND gate 71, OR gate 72, and one bit delay 73, which are interconnected as follows. The first AND gate 70 has three inputs coupled to the multiplier register at bit latch 74, the multiplicand register before 1 bit delay 75, and the timing register after ½ bit delay 76, respectively. The second AND gate 71 has three inputs, two of which are coupled respectively to the timing register after ½ bit delay 76 and the wordmarker bus (WMr). The outputs of AND gates 70 and 71 are coupled to the two inputs of OR gate 72. The output of OR gate 72 is coupled to a first summer 50 of the summation means and the input of a 1 bit delay 73. The 1 bit delay 73 delivers an output after a one bit delay in the third input of the AND gate 71.

The operation of the partial product selector in forming a partial product may be explained with reference to FIGS. 6 and 7. FIG. 6, using the nominal bit times $T_1$ to $T_{32}$ for defining time, illustrates the word marker waveform, and the partial products PP1 to PP16. The shifted multiplicand of the first partial product (PP1), produced by the first partial product selector PP1 is bounded by the bit times $T_3$ through $T_{18}$ (16 bits) and is operated on by the first bit of the multiplier. The shifted multiplicand of the succceeding partial products are also bounded by 16 bit intervals, ending with the last partial product PP16 occurring between bit times $T_{19}$ and $T_{20}$. Each partial product also includes zero or more zeros starting at bit time $T_3$ and continuing until the multiplicand is replicated, and sign extension continuing after replication of the multiplicand to bit time $T_{34}$ ($T_2$ next word). When added simultaneously via the summation means, assuming that the summation means introduces no additional delay, the partial products produce a product word with a LSB commencing at time $T_3$ and ending in a double sign bit 32 bits later ($T_{34}$) (or $T_2$ next word). Formation of the partial products will now be described.

During the first (low) portion of the timing waveform taken from the timing register, the first partial product selector (in PP1) generates the magnitude bits and one sign bit in two's complement notation of the first partial product (PP1) corresponding to the multiplicand (assuming a "1" multiplier bit). As previously noted, the partial product selector has supplied thereto the least significant bit ($X_1$) of the multiplier, the multiplicand delayed to start at bit time $T_3$, and the timing waveform equally delayed. The timing waveform at the input to the stage remains in a high condition until the first bit of the product word at bit time $T_3$ when it goes to a low condition. At bit time $T_2$ the least significant bit $X_1$ of the multiplier has been entered and at bit time $T_3$ the first bit of the multiplicand $a_o$ is applied to the input of the AND gate 70. With an inversion in half bit delay 76, the timing waveform at the AND gate is high. Assuming both $X_1$ and the first bit $a_o$ are 1's, the AND input condition of gate 70 is satisfied and a "1" for the first bit of the partial product appears at the output of AND gate 70. Since the OR gate 72 responds to a "1" from either the output of AND gate 70 or 71, the OR gate couples the first 1 in the partial product to the summation means. (The "1" which has just appeared at the output of OR gate 72 is also coupled to the input of the 1 bit delay 73. The "1" is not regenerated because the AND gate 71 is held in an "off" condition.) Should the second bit of the multiplicand be a 0, a 0 output is coupled to the summation means at the second bit time ($T_4$). In short, assuming a multiplier bit of 1, each successive bit of the multiplicand from the LSB to the sign bit is coupled to the first input terminal of the summation means during the bit times $T_3$ to $T_{18}$. Had the first multiplier bit been a 0, then a succession of 0's would have been coupled from the partial product selector 41 to the summation means. When the last bit of the multiplicand $a_o$ passes, the timing waveform, taken from the register, whose low condition is set equal to the length of the multiplicand, now ends and reverts to a high condition. This prevents any further output from the AND gate 70.

During the second portion of the timing waveform taken from the register, the first partial product selector generates the sign extension of the first partial product (PP1). As the last, or sign bit is passing through OR gate 72, it is delayed one bit in the delay 73, and now appears at the input of AND gate 71. If the sign bit is a "1" at the beginning of $T_{19}$, the waveform taken from the register and the reference timing waveform are all "1's" and the conditions for a "1" output from AND gate 71 are met. A "1" at the output of the AND gate 71, which is coupled to the input of OR gate 72, produces a "1" output from OR gate 72. The "1" output from OR gate 72 is coupled to the summation means. In addition, the OR gate output, after a 1 bit delay, is reapplied via AND gate 71 to the input of the OR gate in a manner to cause a repetition of the "1" bit so long as the reference timing waveform is in a low state. Since the reference timing waveform continues in the low state to the last bit of the product word ($T_{34}$), extension of the "1" sign bit also continues to bit time $T_{34}$). Had the sign bit been a "0," the OR gate 49 would have remained in a "0" state until bit time $T_{34}$. In the foregoing manner, the first partial product (PP1) is terminated with sign extension continuing to the last bit of the product word (bit time $T_{34}$).

The first partial product PP1 is formed by operation of the multiplicand in response to the least significant multiplier bit ($X_1$). Accordingly, the first partial product contains the least delayed (1 bit) multiplicand. In other words, the shifted multiplicand in the first partial product enters the summation means first, weighted according to the multiplier bit position. This is consistent with the fact that the partial product PP1 is the least significant partial product. The subsequent partial products increase in significance by one bit steps.

The remaining partial product selectors in stages PP2–PP15 function similarly to the first. Each successively higher numbered selector produces a partial product of successively higher significance. Both the reference timing waveform WMr and successively the delayed timing waveforms derived from the timing register are applied to these partial product selectors. In the second partial product selector (PP2), at bit time $T_3$, the timing waveform WMr is low, but the timing waveform derived from the register remains high. AND gate 70 produces a "0" and AND gate 71 produces a "0." Consequently, the OR gate 72 produces a "0" at bit time $T_3$ for the first term of the second partial product. At the next bit, the shifted multiplicand commences, followed by sign extension. The fifteenth partial product selector produces a partial product PP15, which commences at bit time $T_{17}$, with 14 "0's" preceding the shifted multiplicand (if the multiplier bit is a "1"), and ends at bit time $T_{34}$ with two bits of sign extension.

The last partial product selector PP16 is the stage to which the last or sign bit of the multiplier is coupled. This selector is similar to the prior selectors in that it produces a partial product consisting of a sequence of 15 zeros, the multiplicand (if the last multiplier bit is a "1"), and the sign bit repeated once.

The output of each partial product selector in partial product stages PP1–PP16 is applied to the summation means, or tree, consisting of summers 50–64, to form the final product (C). As indicated, the output of each selector PP1 through PP15 is coupled to an additive input of the summation tree. The last selector PP16 is, however, coupled to a subtractive input of the summation means (i.e. via two's complementer 65). The subtraction of the last partial product PP16 is appropriate for operands in two's complement notation. In this notation, the last bit, the sign bit, is denoted by a "1" if the sign bit is negative, and by a "0" if the sign bit is positive. The algorithm for four quadrant multiplication of numbers in two's complement notation is effected when the last (most significant) partial product is subtracted. The sign bit of the product C is repeated (once). (For subsequent use, the second sign bit in the product may be gated out or used for subsequent overflow detection.) The partial products PP1 to PP16 are combined in the summation tree two at a time, (PP1 + PP2), (PP3 + PP4), etc., in a first rank of the summation tree (summers 50–57) with the subtotals re-summed in a second rank (58–61), a third rank (62–63) and a fourth rank 64 to consolidate the bit stream into a single total. The first 32 bit double precision product, with the sign bit repeated once, then appears in appropriate two's complement notation at the output of the summation means 46. Assuming no delay in the summation means, the final product occurs at times $T_3$ through $T_{34}$ ($T_2$ next word). With a four bit delay in the summation means, it occurs in the bit means $T_7$ through $T_{38}$ ($T_6$ next word).

Figure 8:
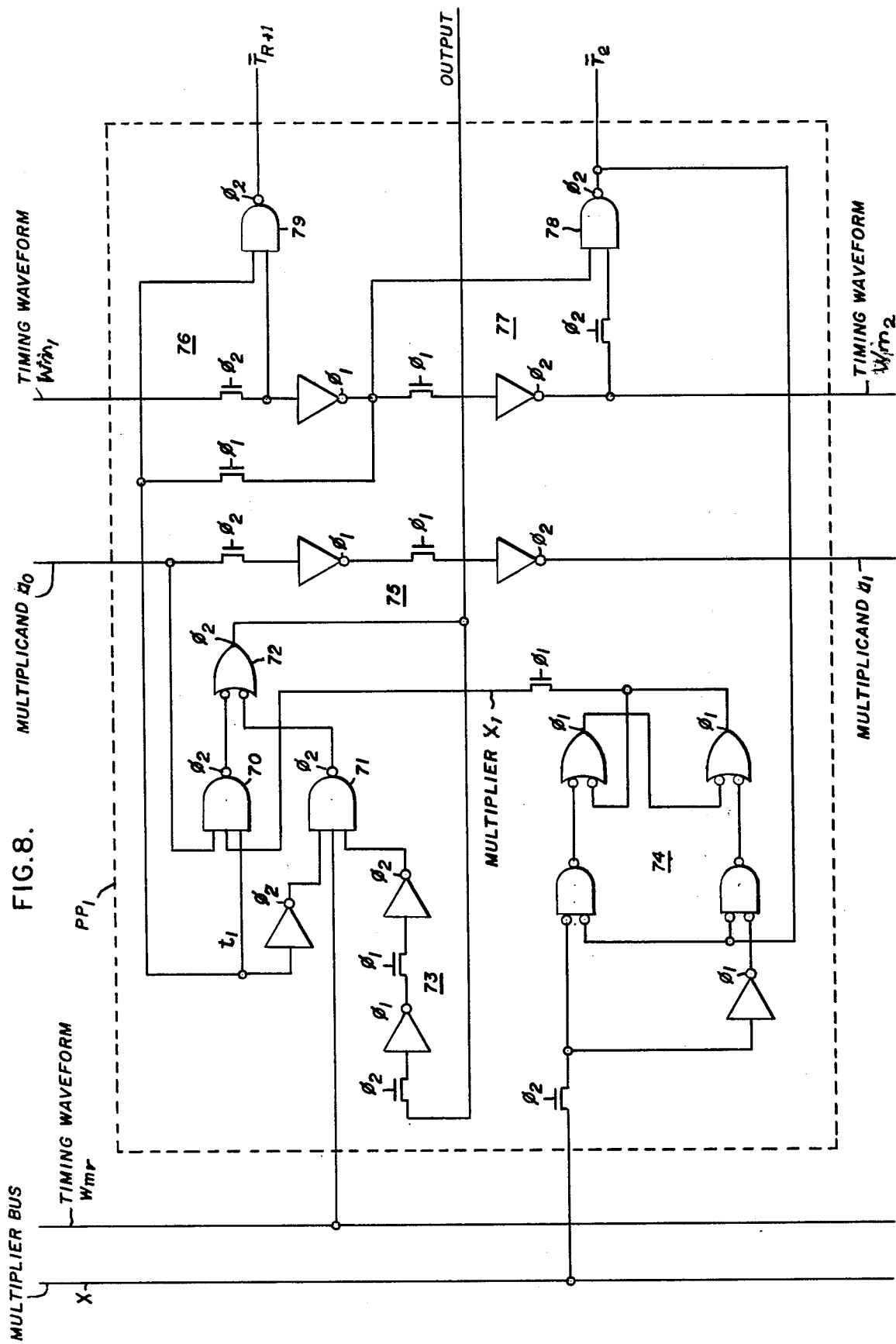
FIG. 8 is a detailed diagram of a partial product stage.

While the double precision four quadrant multiplication logic may be carried out in a variety of forms, FIG. 8 illustrates an embodiment made from a P-channel MOSFET process making a preferential use of minimum geometry NAND gates. FIG. 8 illustrates a single partial product stage or cell of the multiplication logic. The stage is constructed as a single "cell" in which the partial product selector is associated with the stages of the three registers providing the multiplier bit, multiplicand and timing waveforms, and two accessory AND gates used for timing.

The AND gate 70, AND gate 71 and OR gate 72 previously shown in FIG. 7 are also present in FIG. 8 and bear the same reference numerals In FIG. 8, the AND gates 70 and 71 are each carried out by two three input NAND gates. The OR gate 72 is carried out by a two input NAND gate. The one bit delay coupled to the OR gate is shown at 73. A stage of the multiplicand register is shown at 75. A stage of the timing waveform (or word marker) register is shown at 76, 77. The timing register stage 76, 77 provides the bit selection signal for AND gate 78 which provides a pulse ($\overline{T}_2$) for selection of the first multiplier bit. The multiplier bit is selected and stored by the circuit 74. In addition, for setting the carries of individual summers in the summation means, outputs may be taken from the timing register and ANDed to produce clearing pulses at the beginning of each word, ($\overline{T}_2$ from AND 78, and $\overline{T}_{r+1}$ from AND 65 79).

The double precision multiplication logic is flexible in respect to word length and sign capability. The arrangement is designed to work without circuit modification for multiplicands of any desired number of bits. If a multiplicand having a larger number of bits is desired, the high period of the word marker or timing waveform is increased to the number of bits of the multiplicand, leaving the low portion unchanged. The number of partial product selectors is normally set equal to the number of bits of the multiplier and the number of bits in the low portion of the work marker is set equal to the same number. In the arrangement which has just been described, subtraction is accomplished by providing a two's complementer in the path of the last partial product selector. This permits the proper handling of input operands in two's complement notation and produces a four quadrant product, also in two's complement notation. As previously noted, the full precision product has a word length equal to the sum of the bits of the multiplicand and the multiplier, ending in two sign bits. The multiplication logic will also accommodate shorter multipliers. While the word length of the multiplier may not be increased beyond the number of partial product gates, it may be decreased. To operate with a shorter multiplier, the low interval of the word marker is reduced to equal the number of bits of the multiplier.

For unsigned multipliers, the highest order register stages, the highest order partial product selector, and the corresponding subtractive input to the summation means are eliminated.

For four quadrant operation with a multiplier in sign magnitude format, a serial two's complementer is coupled after the summation means and the last multiplier bit is set equal to zero. In four-quadrant operation, to eliminate the extra sign in the product, a shortened timing waveform may be applied to the sign extension input of the partial product selectors.

The previously cited U.S. Pat. No. 3,947,670 to John M. Irwin et al treats a single precision multiplication logic using circuits applicable to the present multiplication logic. In particular, the registers for the input operands and the timing waveform may be of the same form as therein shown. The summation means may use individual stages of the type disclosed in the cited patent application. The two's complementer (65), which may be used in the output of the last partial product stage PP1 to invert the sign of the product, may take the form shown in the cited application. The same two's complementer is more completely described in the U.S. Pat. No. 3,914,590 to John M. Irwin et al.

The multiplication logic just described is the subject of a copending U.S. patent application entitled "Signed Double Precision Multiplication Logic" of John M. Irwin, Ser. No. 811,193, filed June 29, 1977.

Continuing with FIG. 3, the output of the double precision multiplication logic 22 is coupled to the internal input of the summer 23. An external input R is also provided to the summer 23. The summer can be used for several functions, as for instance, adding an operand or rounding.

The output of the summer 23 is coupled to the summer 24, whose principal components are elements 81, 82 and 83. The elements 81 and 82 are two's complementers to which the internal data stream from summer 23 and the external data stream from the external input S1 are applied, and which have the control terminals (XD−) and (S1−) respectively. The sign controlled outputs of 81 and 82 are coupled for summation to the means 83, at the output of which a first external output (O1) appears. An internal output is coupled to the final summer, summer 25.

The summer 25 comprises the elements 84, 85 and 86. The elements 84 and 85 are two's complementers to which the internal data stream (O1) from summer 24 and the external data stream from the external input S2 applied. The control terminals of 84 and 85 are joined at a terminal marked (O2−). The sign controlled outputs of 84 and 85 are coupled for summation to the summation means 86, from which the second external output O2 of the arithmetic unit is obtained.

The time delays of the arithmetic unit may be seen in FIG. 6. The D1, D2 and X inputs occur at bit time ($T_1$). D1 and D2 are combined and the "X" input is rounded and the first bit stored in the multiplication logic at bit time $T_2$. The first multiplicand is entered in the multiplication logic at bit time $T_3$. The last bit of the multiplier is entered at bit time $T_{17}$, and the last multiplicand is entered at bit time $T_{18}$. The full product appears at the input to the summation tree from bit times $T_3$ to $T_2$ (next word). Summers 23, 24 and 25 each add 1 bit of delay. The output of 23 commences at bit time $T_8$, while the input S1 is in step with it. The output O1 commences at bit time $T_9$, while the input S2 is in step with it. The output O2 commences at bit time $T_{10}$. In short, as seen from entry of the sign bit of the D1 input at at bit time $T_{16}$ to the appearance of the sign bit at bit time $T_8$ (next word) requires 24 bits. This is the transport delay discussed earlier in the description.

In FIG. 9a an exemplary recursive filter combining an arithmetic unit is shown in block diagram form. The filter has a low pass characteristic. The arithmetic unit is symbolized by the blocks 21, (22, 23), 24, 25 and the delay unit by blocks 26 and 27.

The data paths of the filter are as follows. The input data (X) is applied with a positive sign control to the D1 input of the summer 21. The output of the summer 21 is coupled to the block 22, 23 in which the multiplication logic 22 is combined with the quantity output summer 23. The K is applied to the X input of the multiplication logic with a positive sign control. The output of the block 22, 23 is coupled to the summer 24 with a positive sign control, and the output of 24 is coupled with a positive sign control to the input of summer 25. The output of summer 25, the O2 output of the arithmetic unit, is then coupled to the A input of the delay unit. This applies the O2 output to the Δ delay block 26. The output of delay block 26 is divided into two feedback paths. In one feedback path the output of 26 is coupled to the D2 input of summer 21 with a negative sign control. In the second feedback path, the output of 26 is coupled via the D" delay block 27 to the S1 input of summer 24 with a positive sign control. The Δ delay in 26 is set equal to the quantity required to achieve a one word delay at the D2 input to the summer 21. Similarly the D" (22 bits) delay in 27 is set equal to a one word delay at the input to summer 24. The output quantity "Y" appears at the output of 26. The quantity Y(n) may be expressed in the following recursive relationship:

$$Y(n) = K_x(n-1) - Y(n-1) - K_y(n-1) \qquad (7)$$

where
n is the time index,
K = the multiplier input (X)
x = the input data input D1

An analysis of the circuit noise properties of a single pole filter using the arithmetic unit indicates that for any word length, rounding provides a 6 db improvement over truncation. Taking a 16 bit data word, the quantity 20 Log R1, where R1 is the ratio between the peak signal to the peak noise, is 96.3 db for rounding versus 90.3 db for truncation, leading to a net improvement of 6 db. In addition, the quantity 20 Log R2, where R2 is the ratio between the peak signal to the deadband for single precision filters varies between 82.3 and 56.3 db with α varying between 0.8 and 0.99. For mixed precision filters, with α lying between 0 and 1, the quantity is equal to 96.3 db, representing an improvement of from 14 to 40 db over the single precision case. In short, the total filtering improvement provided by the indicated circuitry in an exemplary single pole filter is from 20 to 46 db over the more conventional single precision arrangement using truncation.

A second one pole filter of somewhat greater complexity is shown in FIG. 9b. The filter comprises a first arithmetic unit 21, (22, 23), 24, 25 connected with a delay unit 26 as in FIG. 9a. However, the data input is not applied to the input of summer 21 of the first arithmetic unit, but rather to the D1 input of the summer 21' in a second arithmetic unit. The output of 21' is coupled to the multiplication logic (22', 23') and thence to the summing means 24'. The O1 output of the summing means is coupled to the S2 input of the summation means in the first chip. The input $K_1$ is applied to the X input of the first multiplication logic (22, 23) and the input $K_0$ is applied to the X input of the second multiplication logic (22', 23'). The output quantity y(n) may be expressed as follows:

$$y(n) = K_0 x(n-1) + (1 - k1) y(n-1) \qquad (8)$$

The FIG. 9b embodiment illustrates the use of S2 − O1 terminal pair in interconnecting two arithmetic units without delay. The FIG. 9b embodiment may be called a mixed precision filter since it has one feedback path which is of single precision (to the input to summer 21), and one of double precision (to the input to summer 24). Both the double precision output of the first multiplication logic (22, 23), wherein the data stream is multiplied by $K_1$ and the double precision output of the second multiplication logic (22', 23'), wherein the input quantity x(n) is multiplied by $K_0$, are supplied to this loop. Compared to a single precision filter of the same general design (with delay 27 omitted) and assuming a $k_0$ of 0.01 and $K_1$ of 0.01 for the double precision filter, and ($k_o$ of 0.01 and $K_1$ of 0.99 of the single precision filter, the mixed precision filter has a marked advantage. For zero frequency, the mixed precision arrangement has a 40 db improvement, which lowers with non-zero frequency. The improvement in the mixed precision filter over the single precision filter is most pronounced at low signal levels. With an input level of 0.01 (.e. $10 \times 10^{-3}$), the error for single precision is approximately $\pm 2 \times 10^{-3}$ or ±20%, whereas for mixed precision it is $\pm O2 \times 10^{-3}$ of 0.2%. For the case of an input level equal to $1 \times 10^{-3}$, the single precision filter does not practically respond at this level, while the mixed precision filter errors are about an order of magnitude below the desired response.

What we claim as new and desire to secure by Letters Patent of the United States is:

1. An integrated arithmetic unit for use in a serial digital network comprising:

A. a first summer for signed serial data having a pair of inputs (D1, D2) for external connection and producing an output sum in signed serial format;

(D1 + D2)

B. four quadrant multiplication logic for signed serial data having a first input coupled to the output of said summer, a second input (X) for external connection, said multiplication logic producing a double precision output product in signed serial format;

(D1 + D2) X and

C. a second summer for signed serial data having a first input coupled to the output of said multiplication logic, a second input (S1) for external connection, and producing an external output sum (O1) in signed serial format:

O1 = [(D1 + D2) X + S1].

2. The arithmetic unit as set forth in claim 1 wherein said arithmetic unit has an external input to which a timing control waveform (WM) is coupled for timing control of said first summer, said four quadrant multiplication logic and said second summer, and timing control defining the execution of said summations and said multiplication and the number of valid bits of said first pair of inputs (D1, D2), the sum of said last recited inputs (D1 + D2), said second input (X) to said multiplication logic, said output product ((D1 + D2) X), and said external output sum (O1).

3. The arithmetic unit as set forth in claim 2 wherein said timing control waveform has a first portion whose duration is set equal to "m" bit times for "m" bit inputs (D1, D2) to said multiplication logic, and having a second remaining portion whose duration is set equal to "n" bit times for an "n" bit external input (X) to said multiplication logic, said two portions defining the number of valid bits (m + n) of said output product ((D1 + D2) X), and adapting said arithmetic unit to input quantities of one of a plurality of word lengths in response to said control waveform.

4. The arithmetic unit as set forth in claim 3 wherein: rounding means are provided connected in the data path between said first serial summer and said multiplication logic, said rounding means
 (a) adding a bit to the data from said first serial summer equal to the most significant fractional bit thereof, and
 (b) subsequently cancelling all fractional bits in the resulting sum to obtain the quantity (D1 + D2)' wherein the (') denotes rounding.

5. The arithmetic unit set forth in claim 4 wherein rounding means are provided connected in the external input data path to said multiplication logic, said rounding means
 (a) adding a bit to said external data equal to the most significant fractional bit thereof, and
 (b) subsequently cancelling all fractional bits in the resulting sum to obtain the quantity (X)"

where (") denotes rounding, the output (O1) of said second summer thereby becoming:

O1 = [(D1 + D2)' X" + S1].

6. The arithmetic unit set forth in claim 5 wherein a third serial summer is provided having an internal input coupled to the output of said multiplication logic, said third serial summer having an external input (R), and an output coupling data to said second serial summer, the output (O1) of said second summer becoming:

O1 = [(D1 + D2)' X" + R + S1].

7. The arithmetic unit set forth in claim 6 wherein a fourth serial summer is provided having an internal input coupled to the output of said second serial summer, and an external input (S2), said fourth serial summer having an external output (O2):

O2 = (O1 + S2).

8. The arithmetic unit set forth in claim 7 wherein the output (O1) of said second serial summer is in the same time reference as the external input (S2) to said fourth serial summer.

9. The arithmetic unit set forth in claim 3 wherein said serial multiplication logic is designed for data at the first internal input (D1 + D2) in two's complement or unsigned notation, and for data in its second, external input (X) in two's complement or unsigned notation, and produces a product in two's complement notation.

10. The arithmetic unit set forth in claim 9 wherein a first and a second sign changing means are provided on said unit for controlling said first (D1) and second (D2) inputs to said first summer, respectively, said first and second sign changing means being serial two's complementers.

11. The arithmetic unit set forth in claim 10 wherein a third and a fourth sign changing means are provided on said unit for controlling said first and said second input (S1) to said second summer, respectively, said third and fourth sign changing means being serial two's complementers.

12. The arithmetic unit set forth in claim 11 wherein
a third serial summer is provided having an internal input coupled to the output of said multiplication logic, said third serial summer having an external input (R) and providing an output to said second serial summer,
a fourth serial summer is provided having a first, internal input coupled to the output of said second serial summer, and an external input (S2), the output of said fourth serial summer being coupled to an external terminal O2, and wherein
a fifth and a sixth sign changing means are provided on said unit for controlling said first and second inputs (S2) to said fourth summer, respectively, said fifth and sixth sign changing means being serial two's complementers.

13. The arithmetic units as set forth in claim 12 wherein
the external output (O1) of said second serial sumer is in the same time reference as the external input (S2) to said fourth serial summer.

14. The arithmetic unit set forth in claim 1 wherein (a) a third serial summer is provided having an internal input coupled to the output of said multiplication logic, said third serial summer having an external input (R), and providing an output to said second serial summer, (b) a fourth serial summer is provided having an internal input coupled to the output of said second serial summer, and an external input (S2), the output of said fourth serial summer being coupled to an external terminal (O2).

15. The arithmetic unit set forth in claim 14 wherein the output O1 of said second serial summer is in the same time reference as the external input (S2) to said fourth serial summer.

16. A digital network comprising:
A. a first serial summer having a pair of signed inputs for producing an algebraic sum,
B. serial four quadrant multiplication logic having a first input coupled to the output of said first serial summer for application of a first m bit multiplicand and a second n bit multiplier input, said multiplication logic producing a double precision output product in words of m + n bits,
C. a second serial summer having a first signed input coupled to the output of said multiplication logic, and a second signed input and producing a second algebraic output sum, and
D. a delay element connected in a feedback path for coupling data from the output of said second summer to said second input to said second summer, having a delay substantially equal to the product word length to combine the output data with the data applied to the first input of said second summer during the succeeding word to form a double precision feedback loop.

17. A digital network comprising:
A. a first serial summer having a pair of signed inputs for producing an algebraic sum,
B. rounding means coupled to the output of said summer for rounding to an m bit word length,
C. serial four quadrant multiplication logic having a first m bit multiplicand input coupled to the output of said rounding means and a second n bit multiplier input (X), said multiplication logic producing a double precision output product in words of m + n bits,
D. a second serial summer having a first signed input coupled to the output of said multiplication logic, and a second signed input, and producing an algebraic output sum, said network having a predetermined transport delay (D) between the input to said first serial summer and the output of said second serial summer,
E. a first delay element connected in a feedback path for coupling data from the output of said second summer and an input of said first summer and having a delay ($\Delta$) substantially equal to the difference in bit times between (m + n) and D, to combine the output data with the data in said other input of said first summer during the succeeding word, and F. a second delay element coupled between the output of said first delay element and said second input (S1) to said second summer, having a delay substantially equal to said transport delay (D), so that the output data is coupled to the data applied to the first input of said second summer during the succeeding word to form a double precision feedback loop.

18. A digital network as set forth in claim 17 wherein said first serial summer, said rounding means, said double precision logic, and said second serial summer are adaptable to operands of a plurality of word lengths and are assembled on a first integrated circuit, and wherein
said first and second delay elements are electrically programmable for said plurality of word lengths and corresponding increases in word processing time and are assembled on a second integrated network.

19. A digital network as set forth in claim 17 wherein
(a) a third serial summer is provided having a first signed input coupled to the output of said second serial summer, a second signed input, and producing a third algebraic sum, the input of said first delay element being coupled to the output of said third serial summer, the output of said second serial summer being in the same time reference, and wherein
(b) the input data to said digital network is coupled to said second signed input of said third serial summer.

20. A digital network as set forth in claim 19 having in addition thereto:
(a) a fourth serial summer having a pair of signed inputs for producing an algebraic sum, the input data being coupled to one input of said fourth serial summer,
(b) second rounding means coupled to the output of said fourth summer for rounding to an m bit word length,
(c) second serial four quadrant multiplication logic having a first m bit multiplicand input coupled to the output of said second rounding means and a second n bit multiplier input, said multiplicand logic producing a second double precision output product in words of m + n bits,
(d) a fifth serial summer having a first signed input coupled to the output of said second multiplication logic, and a second signed input (S1) and producing an albegraic output sum coupled to the second signed input of said third serial summer.

21. A digital network as set forth in claim 20 wherein said first serial summer, said rounding means, said first double precision multiplication logic, said second serial summer and said third serial summer are assembled on a first integrated circuit, and wherein
said fourth serial summer, said second rounding means, said second double precision multiplication logic, and said fifth serial summer are assembled on a second integrated circuit.

* * * * *